United States Patent [19]

Franke et al.

[11] 4,400,749

[45] Aug. 23, 1983

[54] CARRIER DEVICE FOR MAGNETIC-ELECTRIC TRANSDUCER ON A READ/WRITE UNIT OPERATING WITH MAGNETIC STORAGE PLATES

[75] Inventors: Konrad Franke, Schweitenkirchen; Christoph Weber, Eching, both of Fed. Rep. of Germany

[73] Assignee: Woelke Magnetbandtechnik GmbH & Co. KG, Sweitenkirchen, Fed. Rep. of Germany

[21] Appl. No.: 199,756

[22] Filed: Oct. 23, 1980

[30] Foreign Application Priority Data

Jul. 25, 1980 [DE] Fed. Rep. of Germany ....... 3028256

[51] Int. Cl.³ .......................... G11B 21/20; G11B 5/54
[52] U.S. Cl. ..................................... 360/104; 360/105
[58] Field of Search ............... 360/103, 104, 105, 109, 360/122

[56] References Cited

U.S. PATENT DOCUMENTS

| 3,673,352 | 6/1972 | Wada et al. | 360/104 |
| 3,676,874 | 7/1972 | Turner | 360/103 |
| 4,315,293 | 2/1982 | Winkler | 360/104 |

OTHER PUBLICATIONS

"Damped Head Arm", Norwood, IBM Tech. Disc. Bull., vol. 21, No. 8, Jan. 1979, p. 3093.
"Combination Head", Reidenback, IBM Tech. Disc. Bull., vol. 22, No. 4, Sep. 1979, p. 1602.

*Primary Examiner*—Robert S. Tupper
*Attorney, Agent, or Firm*—Krass, Young & Schivley

[57] ABSTRACT

The invention relates to a carrier device for a magnetic-electric transducer in a read/write unit operating with magnetic storage plates, with a carrier element which can deflect in a direction perpendicular to the plane of the magnetic storage plates.

9 Claims, 7 Drawing Figures

CARRIER DEVICE FOR MAGNETIC-ELECTRIC TRANSDUCER ON A READ/WRITE UNIT OPERATING WITH MAGNETIC STORAGE PLATES

DESCRIPTION

1. Technical Field

The invention relates to a carrier device for a magnetic-electric transducer in a read/write unit operating with magnetic storage plates or discs, with a carrier element which can deflect on a direction perpendicular to the plane of the magnetic storage plates.

2. Background Art

A known carrier device of this type is joined with a guide device which is the fixed component of a drive mechanism for flexible magnetic storage plates and serves to transport the magnetic-electric transducer in a radial direction of the magnetic storage plates and to position on chosen magnetic storage tracks. The flexible magnetic storage plate is inserted into the drive mechanism from the side and and thereby reaches the effective region of the magnetic-electric transducer, which is fastened onto a carrier arm which can be swung out on the guide device out of the plane of the magnetic storage plate or disc against spring force in order to make it possible to insert the magnetic storage plate. For the double-sided operation of the magnetic storage plate, two magnetic-electric transducers are provided which lie against the upper side and the lower side respectively of the magnetic storage plate. For this the lower transducer is generally fastened to a rigid lower carrier arm, whereas the upper carrier arm can be swung in the manner described. It is also possible to mount both transducers so as to be able to deflect.

The mechanics of the carrier arm, in combination with the guide device by which the tranducer is transported on the radial direction of the magnetic storage plate, is very complicated and expensive, since on the one hand a very accurate basic positioning of the transducer on a prescribed reference position is required if the tracks of the magnetic storage plate are to be reached as accurately as possible, and on the other hand changes in the position of the read/write plane caused by the flexibility of the magnetic storage plates must be compensated for or carried out together, in order to obtain always constant output signals from the transducer. The consequence of this is that a magnetic-electric transducer must rest on the magnetic storage plate with a prescribed compressive force of the order of 20 grams, but despite this it must follow brief deflection movements of the magnetic storage plate. Besides this, the transducer is supposed to always rest on the magnetic storage plate with its whole contact surface, not with a side edge or corner. For this purpose the transducer is mounted on its carrier arm in a spring frame in the manner of a semi-cardanic suspension, which in turn is fastened to the carrier arm with adjusting screws. In addition to the basic adjustment of the carrier arm on the guide device, further adjusting work on the suspension of the spring frame is also required. This expenditure of work is correspondingly greater with a double-sided operation of the read/write unit with two transducers mounted to be deflectable.

Problems similar to those described above exist on carrier devices for magnetic-electric transducers which are to be introduced onto read/write units in combination with rigid magnetic storage plates. These transducers operate by the rotation of the rigid magnetic storage plate in the so-called flying operation, that is, they are suspended on extremely short distance above the plate's surface. For this they are retained on a spring element which can deflect perpendicularly to the plane of the magnetic storage plate, so that the flying operation of the transducer after lying on the magnetic storage plate in a state of rest shows aerodynamic phenomena connected with the rotation of the magnetic storage plate and a spring deflection caused by this. The elasticity and the adjustment of the spring element essentially determine the working distance of the transducer from the plate surface, so that very high accuracy requirements must be imposed on these properties. Besides this, the initial sliding of the transducer on the plate surface results in a fairly high wear, and special tracks must be reserved for this.

It is the problem of the invention to supply a carrier device for a magnetic-electric transducer which, with a simple and inexpensive construction, can be adjusted very easily, is comparatively insensitive to external mechanical force effects, and despite this insures the greatest possible electrical security against deviations in the position of the magnetic storage plate, so that it is universally suitable for use in combination with flexible and rigid magnetic storage plates.

Disclosure of the Invention

This problem is solved, for a carrier device of the type mentioned at the outset, according to the invention, by providing as the carrier element a film, preferably in tape form, which is under tensile stress in the nondeflected state and which, at least in read/write operation, is held stationary in a plane approximately parallel to the magnetic storage plate.

A carrier device according to the invention requires no expensive and complicated mechanism with which a transducer can be swung out of the plane of the magnetic storage plate, and is distinguished by extremely small masses to be moved. Besides this it requires no spring mechanism which exerts a predetermined pressure by the transducer on a flexible magnetic storage plate, for the only carrier element provided is a film which is under a tensile stress in a state of rest. When the transducer is fastened onto such a film and this is held stationary, then in operation a predetermined pressure can be exerted by the transducer on a magnetic storage plate inserted into a drive mechanism, by the tension of the film itself, on the one hand, and on the other hand it is also possible by reason of the elasticity of the film which is under tensile stress to cause the transducer to deflect perpendicularly to the plane of the flexible magnetic storage plate when the latter is inserted in the drive mechanism or changes its position in motion or undergoes corresponding deformations. Despite this the required pressure of the transducer is maintained, and it is also ensured that the transducer is situated opposite the magnetic storage plate in an always accurately defined position when the latter is inserted into the drive mechanism. By having the transducer fastened onto the tensioned film, it can follow any possible movements of the magnetic storage plate in any deflection direction lying oblique and perpendicular to the plane of the flexible magnetic storage plate. This corresponds to a fully cardanic suspension. In this way and due to the small mass of its carrier element, the transducer can make considerably more rapid deflection motions as compared to the previously known devices, which assures a better contact between the transducer and the magnetic storage plate and achieves a higher constance of the electric signal from the transducer.

An essential advantage of arranging the transducer on a carrier element in the form of a tensioned film is that when the transducer is deflected, a progressively increasing pressure is exerted on a flexible magnetic storage plate, whereas known devices of this type exert a constant pressure by the transducer on the magnetic storage even with large deflections. By means of a pressure increasing progressively on deflection the constancy of the output signal is also favored, since vibratory motions are prevented after higher deflections.

The carrier device according to the invention is also suitable for use in combination with rigid magnetic storage plates since, in contrast to the carrier elements previously used, a film under tensile stress in the nondeflected state as a carrier element for the transducer offers the notable advantage of a more accurate setting of the initial valves for the suspension of the transducer. This particularly concerns the parallel setting of the retaining forces acting in the flying state of the transducer, by means of the tensile stress applied initially. For this it is also conceivable not to let the transducer rest on the plate surface in the resting state of the read/-write unit, but rather to hold it at an accurately defined extremely short distance from the plate surface, so that no wear on the plate surface results in starting up and in stopping the unit.

The film advantageously consists of a plastic material, preferably of polyethylene terephthalate, of the type commonly sold under the trademark "MYLAR". It is likewise possible to use a metal foil as carrier element, depending on the particular construction requirements on a given case. If a plastic film is used, however, it is possible to apply to this film the printed conductors which are required for the electric wiring of the transducer, thereby avoiding disturbing mechanical conduction effects on the transducer. Also the use of plastic offers the advantage that changes in the position of the tracks caused by variations in temperature and humidity of the air can be largely compensated for.

Since any special adjustment of the carrier element itself is not required because of its being held stationary, only the stationary element provided for holding the carrier element need be brought into an exactly predetermined position in constructing a drive mechanism. For this, then, a carrier arm is provided which holds the film and is mounted adjustably outside the range of motion of the magnetic storage plate. Then it is only necessary to bring this carrier arm into a predetermined position to the magnetic storage plate as regards its height position and its radial position and to set it so that the transducer located on the tensioned foil lies in a plane of reference parallel to the plane of the magnetic storage plate. In this way the fabrication expense for a carrier device is reduced substantially, and the previously high failure figures on manufacture, which are attributable to erroneous setting are avoided or at least reduced substantially.

The greater ease of adjustment of a transducer fastened onto a film is essentially made possible by the following effects:

1. The transducer can absorb both tensile and compressive forces during the adjustment process without irreversibly changing its position.

2. A stationary support for the foil is practically insensitive to forces acting on it during the adjustment.

3. The stationary support makes it possible to apply accurate reference surfaces which in turn guarantee that the transducer is always positioned parallel to a magnetic storage plate or to a transducer placed opposite it. The expenditure of adjustment required for this on the conventional suspension systems, at least for a movable arm, is therefore eliminated by the film suspension.

The film may advantageously be provided with a vibration-damping material which may be applied at the most favorable position possible. It is likewise possible to provide the film with a layer of the vibration-damping material. In this way, it is possible to influence the resonance frequency of the suspension of the magnetic-electric transducer and to exclude the occurence of natural vibrations in advance. In this way too, the contact between the transducer and a flexible magnetic storage plate is substantially more reliable than in the previously known mechanical spring arrangements, with a comparatively small expenditure of additional measures.

BRIEF DESCRIPTION OF THE DRAWINGS

Further developments of the invention which favor the solution of the problem posed are stated in the subclaims, and essential features and advantages of emodiment examples for use in combination with flexible magnetic storage plates are described in the following on the basis of the figures. In these:

BEST MODE FOR CARRYING OUT THE INVENTION

Figure 1:
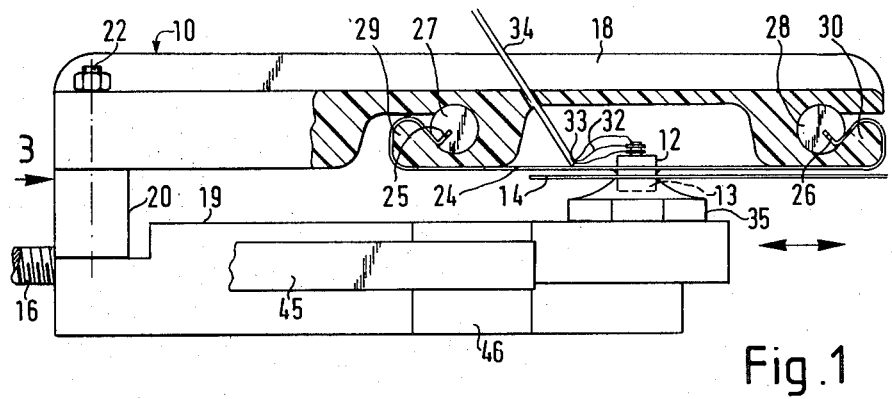
FIG. 1 shows a longitudinal section of a carrier device according to the invention which is combined with a guide device for transporting onto a drive mechanism for flexible magnetic storage plates.

In FIG. 1 is represented a carrier and guide device 10 for two magnetic-electric transducers 12 and 13 for the double-sided operation of a flexible magnetic storage plate 14. It can be pushed in a radial direction of the magnetic storage plate 14 in the direction of the arrow shown, by means of a drive to which a rotary spindle 16 belongs. The carrier and guide device 10 has an upper carrier arm 18 and a lower carrier arm 19 which are attached together rigidly by means of a bridge 20. For the attaching and adjusting screws 22 are provided on the embodiment example represented, which make possible an accurate alignment of the two carrier arms 18 and 19 with one another and with a prescribed magnetic storage track, so that thereby the two transducers 12 and 13 can be accurately positioned.

It can be recognized from the partial section shown in FIG. 1 that the upper transducer 12 is fastened to a carrier film 24 which is made in tape form and is admitted by its ends 25 and 26 into friction pins 27 and 28 which are seated on recesses on the upper carrier arm 18 shaped to correspond to them and by rotation bring the carrier film 24 into a prescribed state of tensile stress which can be maintained by having the friction pins 27 and 28 fixed friction-tight in the recesses assigned to them. The upper carrier arm 18 is provided with projections 29 and 30 in such a way that the carrier film 24, after it has been run around them, is tensioned on a plane parallel to the plane of the magnetic storage plate 14. The carrier arms 18 and 19 advantageously consist of a plastic and are fabricated by an injection molding process, as is also the case for the corresponding known units.

The upper transducer 12 is provide with connecting wires 32 which are fixed on the carrier film 24 at 33 and there are connected with connecting lines 34 which lead to a read or write circuit, not represented. The lower transducer 13 is connected in the same manner (not shown) and arranged on the rigid lower carrier arm 19 on a housing 35 which fits it.

Figure 2:
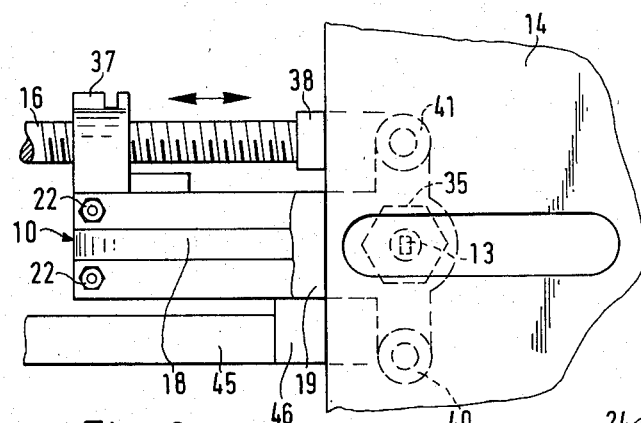
FIG. 2 shows a top plan view of the lower part of the arrangement shown in FIG. 1 as assigned to a magnetic storage plate located in a casing.

FIG. 2 in a top plan view shows the carrier and guide device 10 partly broken so that on the right part of the figure the assignment of a magnetic storage plate 14 of the usual kind to the lower transducer 13 can be recognized. The upper carrier arm 18 is rigidly joined by way of the bridge 20, as shown in FIG. 1, with a spindle guide 37 which is guided on the rotary spindle 16, so that rotating the rotary spindle 16 results in transporting the whole carrier and guide device 10 in the arrow direction represented, radially to the magnetic storage plate 14. For this a further guide 38 is used which is likewise rigidly joined to the carrier and guide device 10.

FIG. 2 shows, moreover, that the lower carrier arm 19 is provided with two lateral extensions 40 and 41 which lie against the under side of the magnetic storage plate 14. These, together with elastic extensions 42 and 43, as shown in FIG. 3, corresponding to them and provided on the upper carrier arm 18, serve to hold the flexible magnetic storage plate 14 in a prescribed plane in the course of its motion and to damp vibratory motions of large amplitude.

Figure 3:
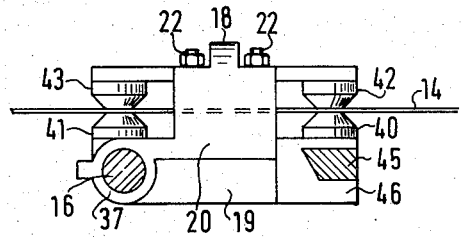
FIG. 3 shows a view of the arrangement shown in FIG. 1 in the direction of view 3 indicated on the latter.

FIG. 3 shows the carrier and guide device on the direction of view 3 shown in FIG. 1. It can be seen that the parts 18, 19, and 20 joined together by screws 22 are guided as a unit by the guide 37 on the rotary spindle 16. In addition a guide rail 45 is provided which is guided on a guide projection 46 and ensures a transport motion of the carrier and guide device 10 without any tilting. This guide rail 45 can also be recognized in FIGS. 1 and 2.

Figure 4:
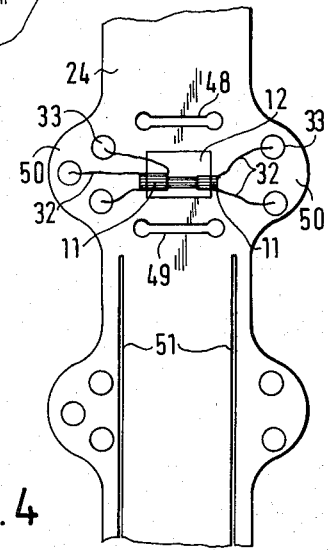
FIG. 4 shows a top plan view of a section of a film as carrier element for a transducer.

FIG. 4 shows a section of the carrier film 24 in a top plan view. The upper transducer 12 is bonded to the carrier film 24 and is arranged in a suitably shaped cutout on the carrier film 24. Its windings 11 are connected by way of the already mentioned connecting wires 32 with the terminal points 33 to which the connecting lines 34 already described are connected.

One slot-like cutout 48 and 49 each is provided in front of and behind the transducer 12 in the radial direction of the magnetic storage plate 14. These two coutouts 48 and 49 cause the transducer 12 to be arranged in a region of the carrier film 24 which is not under tensile stress. In this way the tensile stress exerted on the carrier foil 24 by its being clamped practically bypasses the transducer 12, so that its deflection motions, which can be universal, and correspond to a fully cardanic suspension, are not influenced by the tensile stress applied.

Moreover it can be seen that the terminal points 33 are provided on protuberances 50 of the carrier film 24 which likewise lie outside of the region acted on by the tensile stress of the carrier film 24. In this way it is ensured that the electrical connections between the transducer 12 and the connecting lines 34 (FIG. 1) is not harmed by the tensile stress. For this a slot 51 can also advantageously be provided parallel to each lengthwise edge of the carrier film 24 on tape form, which slot likewise insures that the edge regions of the carrier foil 24 are likewise free of tensile stress. In this case printed conductors (not shown) can even be provided on the carrier film 24, so that self-supporting connecting wires 34, as they are shown in FIG. 1, become unnecessary as a whole. This then offers the advantage that the deflection motions of the carrier film 24 are not disturbed by the mechanical effects of self-supporting connecting wires during the motion of the magnetic storage plate 14.

Figure 5:
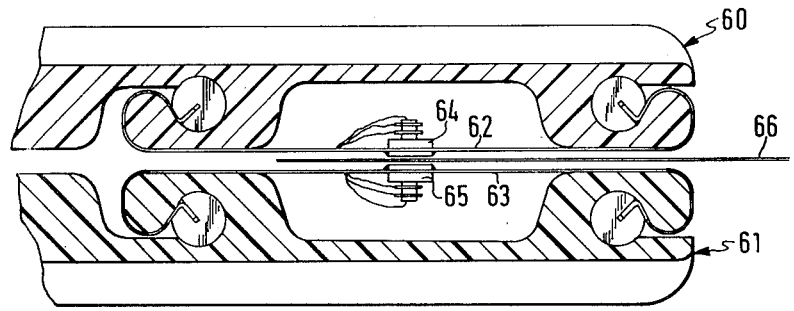
FIG. 5 shows an embodiment example of a carrier device for two transducers carried in deflectable form in a drive mechanism for double-sided operation.

FIG. 5 on a longitudinal section shows the use of a carrier device according to the invention, as it was described on the basis of FIGS. 1 to 3 for the upper carrier arm 18, for a read/write unit which works by the double-sided operation of a magnetic storage plate 66. The upper and the lower carrier arms 60 and 61 are constructed the same and each holds a carrier film 62 and 63 of the construction already described on the basis of FIG. 1. An upper and a lower transducer 64 and 65 are held on the rigid carrier arms 60 and 61 in such a way that they lie against the upper side and the lower side, respectively, of the magnetic storage plate 66 and make possible the reading and/or writing operation on its magnetic storage tracks. Both transducers 64 and 65 may be deflected vertically to the plane of the magnetic storage plate 66, so that they can follow the irregularities of the latter in the manner described.

Figure 6:
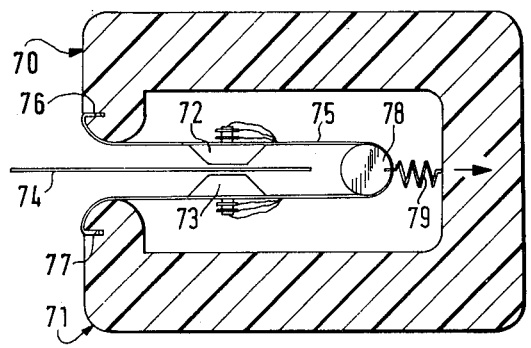
FIG. 6 shows an arrangement similar to FIG. 5 with a different suspension principle for the transducer.

FIG. 6 shows a construction principle of carrier arms 70 and 71, which are rigidly joined together, for an upper transducer 72 and a lower transducer 73 which interact with the upper or lower side of a flexible magnetic storage plate 74. The carrier used here is a carrier film 75 common to both transducers 72 and 73, the ends 76 and 77 of which film are engaged and firmly anchored on the free ends of the carrier arms 70 and 71. The carrier film 75 is run around a tension rod 78 which is tensioned in the arrow direction shown by means of a stretching device 79 represented diagrammatically in FIG. 6 and consequently provides the carrier film 75 in tape form with the tensile stress required on the nondeflected state. By this principle a symmetrical distribution of forces is attained with respect to the suspension of the two transducers 72 and 73 and the adjusting as a whole is simplified.

Figure 7:
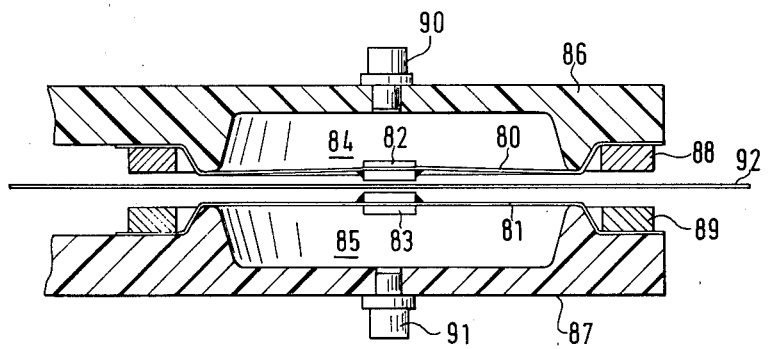
FIG. 7 shows a further embodiment example of a carrier device for double-sided operation.

FIG. 7 shows one construction possibility in which the carrier film 80 and 81 for an upper transducer 82 and a lower transducer 83 covers a chamber 84 and 85 on the upper and lower carrier arm 86 and 87, respectively. The carrier film 80 and 81 and/or the chamber 84 and 85 here may be constructed circular or angular and is held by a locking ring 88 and 89 respectively, which is fastened in a manner not represented in detail, to the carrier arms 86 and 87.

The chambers 84 and 85 make it possible to introduce an excess pressure or reduced pressure by means of a valve arrangement 90 or 91, respectively. In this way prescribed starting conditions may be set for the carrier film 80 and 81 and varied if necessary in order to permit adaptations to different operating conditions such as for example temperature, atmospheric pressure and atmospheric moisture. For the upper carrier film 80 it is denoted that the chamber 84 is under a reduced pressure, so that the upper carrier film 80 is deflected upward slightly with respect to the magnetic storage plate 92. It is conceivable to produce signals required for controlling the respective excess pressure or reduced pressure by means of wire strain gauges which are provided on the respective carrier film 80 or 81.

As FIGS. 6 and 7 show, the transducers 72 and 73 or 82 and 83 may be beveled or provided with additional bevels, at least on their sides turned toward and away from the center of the magnetic storage plate 74 or 92, in order to make possible the insertion and the withdrawal of the magnetic storage plate 74 or 92, which if necessary is in a casing, even when the two transducers 72 and 73 or 82 and 83 are lying against one another by reason of their rigid carrier arms or are situated opposite one another at a very short distance. Thus it is not necessary to design the one carrier arm to be swingable in the constructions described above, as is done in the previously known units with relatively complicated mechanisms.

The embodiment examples of the invention described above and represented in the figures operate with a film under tensile stress as carrier element for any one magnetic-electric transducer. This carrier element has already been deflected perpendicularly to the plate surface by the insertion of a flexible magnetic storage plate into the read/write unit. This deflection caused already in a state of rest is not represented in the figures since it is only very small and practically undetectable in the chosen scale of the drawing.

We claim:

1. A carrier apparatus for magnetic reading and writing heads and the like which cooperate with a magnetic storage disc comprising:
   support means;
   a strip of flexible film material having opposite ends secured to the support means and tensioned lengthwise; the longitudinal direction of said film strip lying radially of said disc in the operative arrangement;
   aperture means in said film strip for providing at least one tension relieved area of said film strip;
   at least one magnetic head mounted on said film in said tension relieved area; and
   conductor means bonded to said film and extending from said tension relieved area to a terminal area.

2. Apparatus as defined in claim 1 wherein said aperture means comprises a plurality of longitudinally spaced, laterally extending slots, at least one such slot being on each longitudinal side of said head mounting area.

3. Apparatus as defined in claim 2 wherein said film strip comprises plural lateral extensions at least some of which are laterally adjacent said tension relieved area, said terminal area being within said extensions.

4. Apparatus as defined in claim 3 further including longitudinally extending slots in said film strip for relieving tension in the edge areas and in said lateral extensions.

5. Apparatus as defined in claim 1 further including disc stabilizing means carried by said support means and in the form of beveled contacts which engage the surface of said magnetic storage disc.

6. Apparatus as defined in claim 1 wherein said support means is configured to provide a cavity between itself and said film strip, said apparatus further including means for supplying fluid pressure to said cavity.

7. Apparatus as defined in claim 1 wherein said film strip is folded at its mid-length to form upper and lower parallel spaced strip portions, said apparatus further including a support rod mediate said upper and lower portions and contacting said film strip to form said fold, and means for applying forces between said rod and said support means for tensioning said film strip.

8. Apparatus as defined in claim 7 wherein said magnetic head is mounted on the internal surface of the upper portion of said film strip, said apparatus further including a second magnetic head mounted on the internal surface of the lower portion of said film strip and facing said one magnetic head, said magnetic disc extending between said magnetic heads and said film strip portions for operative association with said heads.

9. Apparatus as defined in claim 1 wherein said support means includes a plurality of spaced longitudinal recesses for receiving the opposite ends of said film strip and friction fit pins within said cylindrical recesses for maintaining said film strips in position and in the tensioned state.

* * * * *